US005674560A

United States Patent [19]

Tanigami et al.

[11] Patent Number: 5,674,560
[45] Date of Patent: Oct. 7, 1997

[54] IMPACT RESISTANT PRIMER

[75] Inventors: Hajime Tanigami, Sakai; Kazuto Abe, Hiroshima, both of Japan

[73] Assignee: Nippon Paint Co., Ltd., Osaka, Japan

[21] Appl. No.: 389,750

[22] Filed: Feb. 14, 1995

Related U.S. Application Data

[63] Continuation of Ser. No. 176,696, Jan. 3, 1994, abandoned, which is a continuation of Ser. No. 732,527, Jul. 19, 1991, abandoned.

[30] Foreign Application Priority Data

Aug. 1, 1990 [JP] Japan ............................ 2-205586

[51] Int. Cl.$^6$ .......................... B05D 1/36; C09D 123/00
[52] U.S. Cl. .................. 427/202; 427/405; 427/409; 428/457; 428/460
[58] Field of Search ................... 427/407.1, 409, 427/412.1, 412.5, 410, 202, 405; 428/457, 483, 523, 688, 460; 528/901

[56] References Cited

U.S. PATENT DOCUMENTS

| | | | |
|---|---|---|---|
| 4,755,434 | 7/1988 | Fujii et al. | 427/407.1 |
| 4,755,435 | 7/1988 | Fujii et al. | 427/407.1 |
| 4,756,975 | 7/1988 | Fujii et al. | 427/407.1 |
| 4,758,645 | 7/1988 | Miyazono et al. | 527/311 |
| 4,789,566 | 12/1988 | Tatsuno et al. | 427/388.2 |
| 4,977,207 | 12/1990 | Hoefer et al. | 524/507 |
| 5,089,569 | 2/1992 | Yamamoto et al. | 525/452 |

FOREIGN PATENT DOCUMENTS

| | | |
|---|---|---|
| 61-114779 | 6/1986 | Japan . |
| 61-114780 | 6/1986 | Japan . |
| 61-118178 | 6/1986 | Japan . |
| 62-11907 | 3/1987 | Japan . |
| 62-21027 | 5/1987 | Japan . |
| A 62-169869 | 7/1987 | Japan . |
| 63-53033 | 3/1988 | Japan . |
| 2142867 | 5/1990 | Japan . |
| 2170874 | 7/1990 | Japan . |

Primary Examiner—Jeffrey C. Mullis
Attorney, Agent, or Firm—Sughrue, Mion, Zinn, Macpeak & Seas

[57] ABSTRACT

A method of forming a coating film, involving the steps of: (i) forming an electrodeposition coat on a substrate; (ii) forming thereon an impact resistant primer coat formed of (A) a polyolefin resin grafted with an acid component and (B) a butylated melamine resin, wherein the weight ratio (A/B) of the polyolefin resin to the melamine resin is 90 to 50 parts by weight of the polyolefin resin:10 to 50 parts by weight of the melamine resin; (iii) forming an intermediate coat thereon; and (iv) forming a top coat thereon. A laminated coating film may be obtained by the method disclosed.

14 Claims, No Drawings

IMPACT RESISTANT PRIMER

This is a continuation of application Ser. No. 08/176,696 filed on Jan. 3, 1994 (now abandoned), which is a continuation of prior application Ser. No. 07/732,527 filed Jul. 19, 1991 (now abandoned).

BACKGROUND OF THE INVENTION

1. Field of the Invention

The present invention relates to a primer for forming a laminated film having good impact resistance. More specifically, it relates to an impact resistant primer (i.e., "present primer") suitable for use in the formation of a coating film for, for example, automobiles, and for the improvement of the impact resistance of films which must have a high impact resistance.

2. Description of the Related Art

It is conventionally known that a modified polyolefin primer obtained by modifying an ethylene/propylene copolymer with an acid such as maleic acid (or maleic anhydride) can be used as an adhesion promotor when a plastic substrate is coated with a paint (see Japanese Patent Publication (KOKOKU) No. 62-21027).

Japanese Patent Unexamined Publication (KOKAI) No. 61-114779 and others disclose a method of improving chipping resistance of a coated film, which comprises applying the polyolefin primer having the same composition as described above, with Tg specified from −30° to −60° C., which is substantially grafted with maleic acid (or maleic anhydride) over an electrodeposition coated film, and thereafter applying thereto a variety of intermediate coats and top coats.

Further, Japanese Unexamined Patent Publication (KOKAI) No. 61-114780 discloses a method of improving chipping resistance of a coated film, which comprises applying the primer as mentioned above over a complex substrate which is composed of a base plastic and an electrodeposition coated steel substrate, and thereafter applying thereto a variety of intermediate coats and top coats.

SUMMARY OF THE INVENTION

Accordingly, the objects of the present invention are to eliminate the above-mentioned disadvantages of the prior art and to provide an impact resistant primer (i.e., "present primer") favorable for use when making film comprising at least two layers, which must have a high impact resistance, such as those applied to, for example, automobiles, and in particular, to alleviate an impact energy differential which is liable to cause delamination between an under coat and an intermediate coats or of an intermediate coat and a top coat in case of an excessive difference of hardness existing therebetween.

A polyolefin per se grafted with an acidic component is very flexible, and the use thereof in the present primer is effective for absorbing an impact energy applied thereto, but the polyolefin provides only a coated film having a low strength and unsatisfactory cohesiveness, and therefore, there is a need for a further improvement of the quality of primer films.

Other objects and advantages of the present invention will be apparent from the following description.

In accordance with the present invention, there is provided a primer consisting essentially of a polyolefin resin grafted with an acid component and a butylated melamine resin, wherein the weight ratio of the polyolefin resin to the melamine resin is 90 to 50:10 to 50.

DESCRIPTION OF THE PREFERRED EMBODIMENTS

The grafted polyolefin resins usable in the present invention include, for example, an ethylene/propylene copolymer having a propylene moiety content of not less than 50 mole %, as disclosed in Japanese Patent Publication (KOKOKU) No. 62-21027, grafted with an acid component such as maleic acid, maleic acid anhydride, in an amount of about 0.1 to 50% by weight, preferably 0.3 to 20% by weight, more preferably 5 to 20% by weight.

The term "butylated melamine resin" as used herein generally means a resin obtained by reacting an amino compound such as a melamine resin with an aldehyde such as formaldehyde or paraformaldehyde through an addition reaction or an addition condensation reaction, and then etherifying the resultant product with, for example, butanol or isobutanol. The preferable amount of etherification is 20 to 90%.

The resulting butylated melamine resin has, for example, methylol groups and imino groups, in addition to the alkylated methylol groups, depending on the extent of the reaction.

In the present invention, it is assumed that other usual melamine resins such as mixed methyl/butyl etherified melamine resins and methylated melamined resins may be used in addition to the foregoing examples, but when these conventional melamine resins are used in the primer of the present invention, the baking temperature must be made higher or the hardening improved through the use of, for example, an acidic catalyst, compared with the butylated melamine resin used in the present invention.

The ratio of the amount of the grafted polyolefin resin to that of the butylated melamine resin is 90 to 50:10 to 50, expressed in terms of parts by weight. This is because, when the amount of the butylated melamine is less than 10%, the resistance to delamination is greatly improved as can be proved by heat cycle testing, and when it is more than 50%, the resulting primer layer has an insufficient flexibility and is less effective for relieving impact energy, and therefore, the ratio must fall within the range defined above to achieve the object of the present invention.

The impact resistant primer preferably comprises 60 to 80 parts by weight of the grafted polyolefin resin and 40 to 20 parts by weight of the butylated melamine resin.

The present primer has a composition suitable for absorbing the impact energy differential between an undercoat comprising a cationic electrodeposition coated film having a high hardness (i.e., pencil hardness ranging from about H to 2H) and a relatively soft intermediate coat of a polyester resin (i.e., pencil hardness ranging from F to H), but the present primer may be also used for absorbing the impact energy differential between an intermediate coat and an anionic electrodeposition coated film, which is softer than the cationic type (i.e., pencil hardness ranging from HB to F), and such an undercoat. The present primer may be also used for absorbing the impact energy differential between an intermediate coat and a top coat, other than that between an undercoat and an intermediate coat.

The present primer preferably contains 5 to 20% PWC (i.e., pigment weight concentration) of a pigment such as talc, zinc oxide or barium sulfate, to improve the adhesion thereof to other coats or substrates.

This is because when these components are used in an amount of less than 5% PWC, the resulting layer is extremely soft and the resulting laminated film is easily cracked when subjected to the heat cycle test, and when it is more than 20% PWC, the resulting layer has an insufficient flexibility, and thus does not show the desired effect of absorbing the impact energy.

The electrodeposition paints which may be used in the present invention are, for example, cationic electrodeposition paints as disclosed in Japanese Patent Publication (KOKOKU) No. 59-15929 (corresponding to U.S. Pat. No. 4,419,467) and anionic electrodeposition paints which are widely used.

As the paints for intermediate coating compositions, there can be used a variety of paints which principally serve to ensure the anticorrosion properties of the under coats and to assist the finishing of subsequently applied top coats, and preferred examples thereof include polyester resins (e.g., alkyd resins) type paints for intermediate coats, in which fine particles of talc are incorporated and which have an excellent resistance to chipping, as disclosed in Japanese Patent Publication (KOKOKU) No. 61-23951.

The impact resistant primer coat and the intermediate coat can both be formed by a wet-on-wet method.

The top coats may be of a solid color or a metallic color and may be an aqueous, powdery or solvent type.

For example, the solid color top coat is formed and finished by once applying a pigmented paint having a white, red or black color onto an intermediate coat of a polyester resin, and typical examples of the metallic color top coat are obtained by applying a metallic paint in which a pigment such as aluminum in the form of a flake is incorporated, and then a clear paint in accordance with a wet-on-wet finishing method as disclosed in Japanese Patent Publication (KOKOKU) No. 62-11907 is applied, or by applying an intermediate coat having a color falling within a proper range of hue and then applying a metallic-like paint containing a coating mica in the form of a flake, and a clear paint in layers, as disclosed in Japanese Unexamined Patent Publication (KOKAI) No. 63-53033.

Typical examples of the clear paints used as top coats include hardened melamine resins having acid values and hydroxyl values as specified in Japanese Unexamined Publication (KOKAI) No. 2-142867.

EXAMPLE

The present invention will now be further illustrated by, but is by no means limited to, the following Examples.
1. Examples for Preparing Present Primers $A_1$ to $A_3$

TABLE 1

| Component | $A_1$ | $A_2$ | $A_3$ (wt parts) |
|---|---|---|---|
| BOR-904*1 | 100 | 100 | 100 |
| Uban U-20N-60*2 | 1.9 | 4.2 | 7.2 |
| carbon black | 1.1 | 1.1 | 1.1 |
| suspending agent*3 | 0.1 | 0.1 | 0.1 |
| Solvesso #100*4 | 25 | 25 | 25 |
| Total | 128.1 | 130.4 | 133.4 |

TABLE 2

| Components | $A_4$ | $A_5$ | $A_6$ | $A_7$ (wt parts) |
|---|---|---|---|---|
| BOR-904*1 | 100 | 100 | — | — |
| Resin A*2 | — | — | 100 | 100 |
| Uban U-20N-60*3 | 11.1 | 16.7 | 1.9 | 4.2 |

TABLE 2-continued

| Components | $A_4$ | $A_5$ | $A_6$ | $A_7$ (wt parts) |
|---|---|---|---|---|
| carbon black | 1.1 | 1.1 | 1.1 | 1.1 |
| suspending agent*6 | 0.1 | 0.1 | 0.1 | 0.1 |
| Solvesso #100*5 | 25 | 25 | 25 | 25 |
| Total | 137/3 | 142.9 | 128.1 | 130.4 |

*1:Ethylene/propylene copolymer grafted with maleic acid having a non-volatiles content of 10%, maleic acid having a non-volatiles content of 10%, available from Sakai Chemical Industries, Ltd. (graft ratio = 3 wt. %)
*2:Resin A was prepared as follows. First, 1000 g of a 10% toluene solution of a propylene-ethylene-butadiene copolymer composed of 47.5% by weight of propylene, 47.5% by weight of ethylene, and 5% by weight of butadiene and having a number average molecular weight of 20,000 was charged to a 2 liter four-necked flask provided with a stirrer, a thermometer, and a cooling tube and, then, was heated to 100° C. Thereafter, 7 g of maleic anhydride and further 0.3 g of benzoyl p eroxide were added thereto, followed by reacting for 3 hours. After terminating the reaction, 30 g of toluene was added and the heating residue was adjusted to 10% by weight to prepare the resin A.
*3:Butylated melamine resin having a non-volatiles content of 60%, available from Mitsui Toatsu Chemicals, Inc. (butylated ratio = 40%)
*4:Disperon 4200-20 available from Kusumoto Chemicals Ltd.
*5:High boiling point aromatic solvent, available from Exxon Chemicals, Ltd.

The above-mentioned components of each primer were mixed in a conventional manner to prepare the desired primer.

3. Preparation of Laminated film
  (i) Undercoat:
     Cationic electrodeposition paint, Power Top U-50 (hardness=2H), available from Nippon Paint Co., Ltd.
     Thickness of dried film: 20 μm
     Baking: 165° C. for 30 minutes
  The present primer was applied at a dry film thickness of 2 to 4 μm, and then the following paint was applied as the intermediate coat:
     Paint for Intermediate Coat:
     Polyester resin paint, Orga P-2 (hardness=F) available from Nippon Paint Co., Ltd.
  The paint was applied at a dry film thickness of 35 μm in accordance with a wet-on-wet method, and these films were baked at 140° C. for 25 minutes (the present primer and the intermediate coat were 2C/1B).
  (ii) Paint 1 for Top Coat:
     Acryl resin paint, Superlac M-80 Silver, available from Nippon Paint Co., Ltd.
  (iii) Paint 2 for Top Coat:
     Acryl resin paint, Superlac O-100 Clear, available from Nippon Paint Co., Ltd.
  The above-mentioned paint 1 for the top coat was applied at a dry film thickness of 18 μm and then the paint 2 for the top coat was applied thereon at a dry film thickness of 30 μm in accordance with a wet-on-wet method, and these films were baked at 140° C. for 25 minutes (the paints 1 and 2 for the top coats were 2C/1B).

The coated film obtained according to the above-mentioned processes was used as a sample for determining the resistance to chipping.

Separately, the foregoing paints 1 and 2 for the top coats were further applied onto the coated film obtained in the above processes, under the same conditions as 2C/1B, and the resulting film was used as a sample for the heat cycle test.

Evaluation Method:
Heat-Cycle Test: A scratch which reached the substrate was formed on the sample, and then the sample was subjected to the following test in which one cycle comprised:
  (i) Cooling at −30° C.±2° C. for one hour;

(ii) Maintaining at room temperature for 80 minutes;
(iii) Heating at 80±2° C. for one hour; and
(iv) Maintaining at room temperature for 80 minutes.

The sample was subjected to the above-mentioned repeated cycles to determine the number of cycles performed until cracking occurred. The results are summarized in the following Table 3. In Table 3, the estimated value "5+" means that more than 5 cycles were required before the sample cracked.

Chipping resistance: This test was conducted under the following conditions, using a Graverro tester:

| Stone: | Crushed stone used for macadamizing a road, according to JIS A 5001 |
|---|---|
| Size: | 10 to 15 mm φ |
| Amount: | 500 g × 5 times |
| Test temperature: | −20° C. |
| Angle: | 90° |
| Air pressure: | 5 kg/cm² |
| Distance: | 35 cm |

Evaluation: The resistance to chipping was determined by visually observing the samples, and evaluated according to the following 5-stage evaluation criteria based on the evaluated value of the coating system in which a primer having a resistance to chipping was not used.

| | |
|---|---|
| ++ | Superior |
| + | Excellent |
| ± | Standard |
| − | Poor |
| —— | Very poor |

Hardness (Primer): The present primer was applied to the surface of a polished steel plate so that the thickness thereof was 10 μm, baked at 140° C. for 25 minutes, allowed to stand for 24 hours, and the hardness (pencil hardness) thereof determined in accordance with JIS (Japanese Industrial Standard) K 5400 8.4.2.

The results are summarized in the following Table 3. In Table 3, the evaluated value "6B−" means that the hardness of the corresponding samples was less than 6B.

The desired effect of the present invention is attained by applying the present primer in which a specific melamine resin is incorporated to prevent a delamination separation of two layers having different hardnesses, in particular between an electrodeposition coat and an intermediate coat having different hardnesses.

We claim:

1. A method of forming a coating film, comprising the steps of:
   (i) forming an electrodeposition coat on a substrate;
   (ii) forming thereon an impact resistant primer coat consisting essentially of (A) an ethylene/propylene copolymer having a propylene moiety content of not less than 50 mol % grafted with maleic acid anhydride in an amount of 0.1 to 50% by weight and (B) a butylated melamine resin, wherein a weight ratio (A/B) of the polyolefin resin to the melamine resin is 90 to 50 parts by weight of the polyolefin resin: 10 to 50 parts by weight of the melamine resin;
   (iii) forming a soft polyester resin intermediate coat having a pencil hardness of F to H thereon; and
   (iv) forming a top coat thereon.

2. A method as claimed in claim 1, wherein the electrodeposition coat comprises a cationic electrodeposition paint.

3. A method as claimed in claim 1, wherein the impact resistant primer coat and the intermediate coat are formed by a wet-on-wet method.

4. A method as claimed in claim 1, wherein the intermediate coat comprises a polyester resin paint.

5. A method as claimed in claim 1, wherein the intermediate coat comprises a colored intermediate paint.

6. A method as claimed in claim 1, wherein the intermediate coat comprises a chipping resistant intermediate paint.

7. A method as claimed in claim 1, wherein the top coat comprises a solvent, powder, or aqueous paint.

8. A method as claimed in claim 1, wherein the top coat is composed of a solid color top coat.

9. A method as claimed in claim 1, wherein the top coat is composed of a metallic top coat and a clear coat thereon.

10. A coating film on a substrate obtained by the method of claim 1.

TABLE 3

Examples and Results of Evaluation

| | Example | | | | | | | Comparative Example | | | | |
|---|---|---|---|---|---|---|---|---|---|---|---|---|
| Primer | 1 $A_1$ | 2 $A_2$ | 3 $A_3$ | 4 $A_4$ | 6 $A_6$ | 7 $A_7$ | 5 $A_5$ | 1 $B_1$ | 2 $B_2$ | 3 $B_3$ | 4 $B_4$ | 5 $B_5$ |
| Amount of melamine resin used (%) | 10 | 20 | 30 | 40 | 10 | 20 | 50 | 0 | 5 | 55 | 0 | 0 |
| Amount of benzoguanamine resin (%) used | 0 | 0 | 0 | 0 | 0 | 0 | 0 | 0 | 0 | 0 | 10 | 50 |
| Cooling-heating cycle test | 5 | 5+ | 5+ | 5+ | 5 | 5+ | 5+ | 1 | 2 | 5 | 1 | 1 |
| Resistance to chipping | ++ | ++ | ++ | ++ | ++ | ++ | + | ++ | ++ | + | ++ | + |
| Hardness | 6B | 5B | 5B | 5B | 6B | 5B | 5B | 6B− | 6B− | 4B | 6B− | 6B− |

Note: The primers $B_1$–$B_5$ used in Comparative Examples were as follows:

$B_1$: Same as the present primer $A_1$ from which 1.9 parts of the Uban U-20-60 were omittet (126.2 parts in all total).

$B_2$: Same as the present primer $A_1$ in which the amount of the Uban U-20-60 was changed to 1.45 parts (126.65 parts in all total).

$B_3$: Same as the present primer $A_1$ in which the amount of the Uban U-20-60 was changed to 19.5 parts (145.7 parts in all total).

$B_4$: Same as the present primer $A_1$ in which the Uban: U-20-60 was changed to Suberbeckamine 13-535J*[6], and the amount of 1.9 parts was changed to 2.3 parts (128.5 parts in all total)

$B_5$: Same as the primer $B_4$ in which the amount of the Superbeckamine 13-535J was changed to 20 parts (146.2 parts in all total)

*[6]: Benzoguanamine resin having a non-volatiles content of 50%, available from Dainippon Ink and Chemicals, Inc.

11. A method as claimed in claim 1, wherein the electrodeposition coat comprises a cationic electrodeposition film having a high pencil hardness of from about H to 2H.

12. A method of forming a coating film, comprising the steps of:

(i) forming an electrodeposition coat on a substrate;

(ii) forming a soft polyester resin intermediate coat having a pencil hardness of F to H thereon;

(iii) forming thereon an impact resistant primer coat consisting essentially of (A) an ethylene/propylene copolymer having a propylene moiety content of not less than 50 mol % grafted with maleic acid anhydride in an amount of 0.1 to 50% by weight and (B) a butylated melamine resin, wherein a weight ratio (A/B) of the polyolefin resin to the melamine resin is 90 to 50 parts by weight of the polyolefin resin: 10 to 50 parts by weight of the melamine resin; and (iv) forming a top coat thereon.

13. A coating film on a substrate obtained by the method of claim 12.

14. A method as claimed in claim 12, wherein the electrodeposition coat comprises a cationic electrodeposition film having a high pencil hardness of from about H to 2H.

* * * * *